(No Model.)  
2 Sheets—Sheet 1.
J. & W. R. THOMAS.
CONDUIT SYSTEM FOR ELECTRIC RAILWAYS.
No. 544,056.  
Patented Aug. 6, 1895.
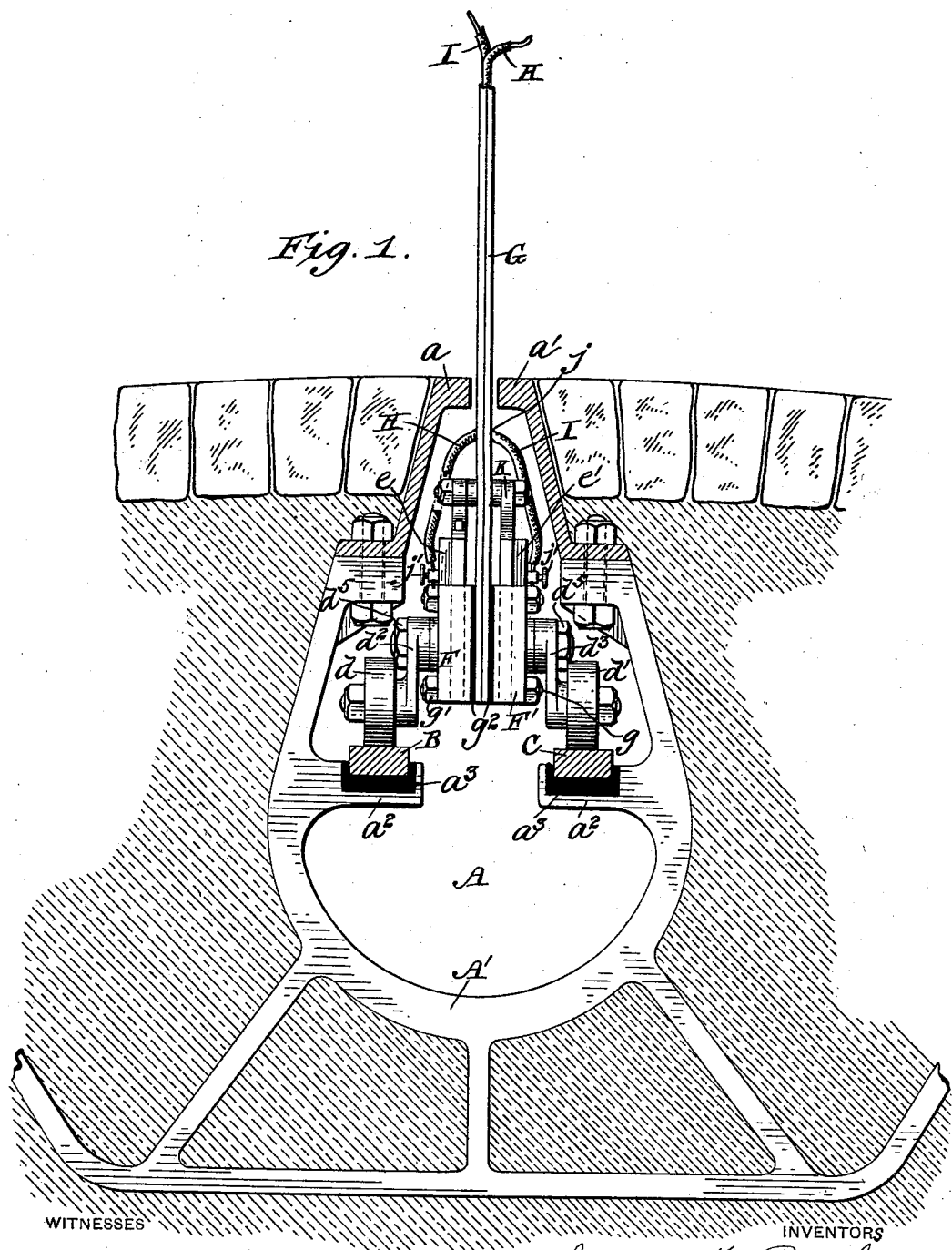

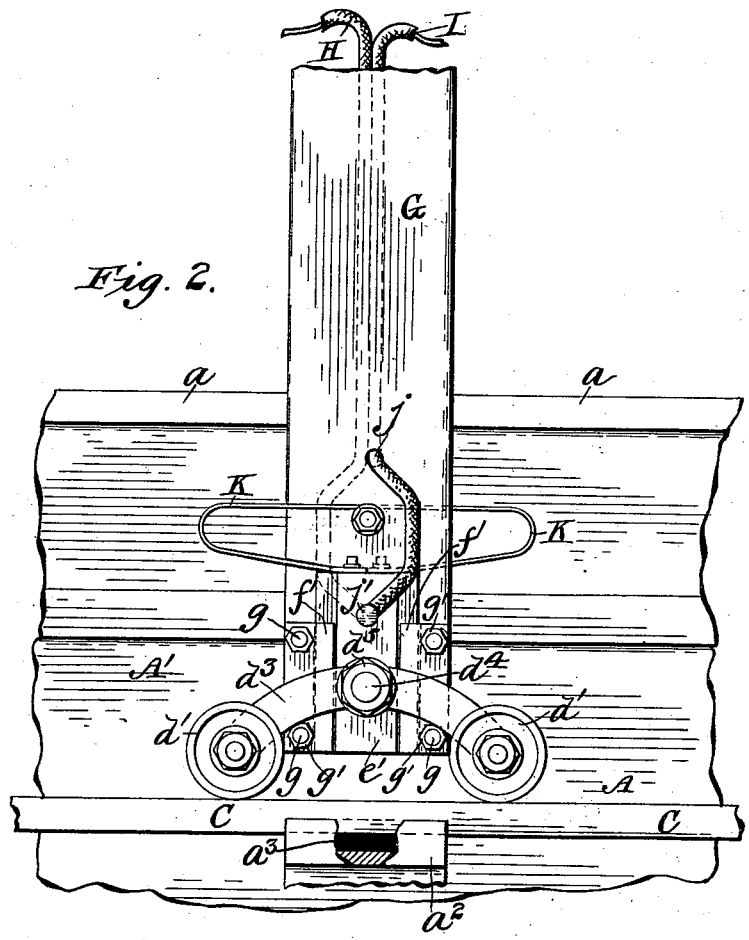
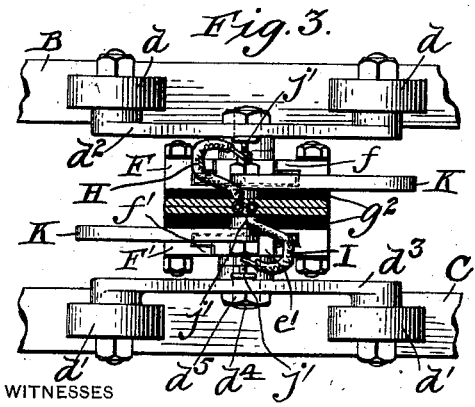
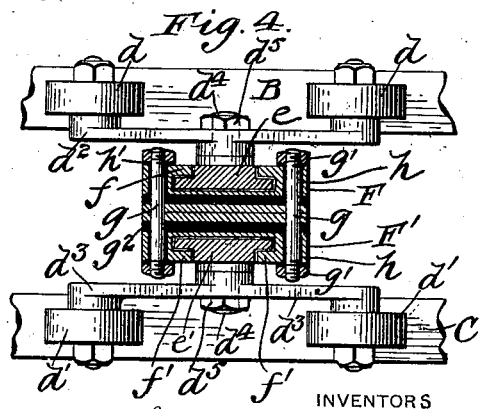

UNITED STATES PATENT OFFICE.

JAMES THOMAS AND WILLIAM R. THOMAS, OF CATASAUQUA, PENNSYLVANIA.

CONDUIT SYSTEM FOR ELECTRIC RAILWAYS.

SPECIFICATION forming part of Letters Patent No. 544,056, dated August 6, 1895.

Application filed December 6, 1894. Serial No. 531,004. (No model.)

*To all whom it may concern:*

Be it known that we, JAMES THOMAS and WILLIAM R. THOMAS, citizens of the United States, residing at Catasauqua, in the county of Lehigh and State of Pennsylvania, have invented certain new and useful Improvements in Conduit Systems for Electric Railways; and we do hereby declare the following to be a full, clear, and exact description of the invention, such as will enable others skilled in the art to which it appertains to make and use the same.

Our invention relates to improvements in conduit systems for electric railways; and it consists of the combination of an underground conduit having conductor-supporting brackets, flat conductors supported by insulators on said brackets, and contacting devices adapted to engage the tops of said flat conductors, said devices being pendent from and connected to the car above the conduit.

It also consists of the combination of an underground conduit having conductor-supporting brackets, conductors supported by insulators on said brackets, contacting devices adapted to engage the said conductors and pivotally connected to independent slides, a bar for supporting said slides, and means for controlling the movements of the slides on said bar by spring-pressure, the said bar being pendent from and electrically connected to the car above the conduit.

It also consists of certain other novel constructions, combinations, and arrangements of parts, all of which will be hereinafter more particularly set forth and claimed.

In the accompanying drawings, forming part of this specification, Figure 1 represents a transverse vertical section through a conduit, showing our conductors in section and our contacting devices in end elevation. Fig. 2 represents a side elevation of one of our conductors and our contacting devices, the conduit being broken away. Fig. 3 represents a top plan view of said contacting devices and rails, the trolley-bar being shown in section; and Fig. 4 represents a horizontal section through the trolley and the guides and slides for the contacting devices.

A in the drawings represents the conduit proper. Slot-rails $a\ a'$ are attached by bolts to the tops of the conduit-yokes A'. These yokes A' are each provided with laterally-projecting conductor-supporting brackets $a^2$, one on each side and extending toward the center of the conduit. Insulating-blocks $a^3$ of any suitable material are set into the upper surfaces of these brackets, so as to lie flush therewith, and are provided upon their upper surfaces with shallow grooves, in which positive and negative conductors B C are seated and supported. These conductors B and C are rectangular in cross-section and present broad flat upper surfaces for the contacting devices, which are preferably narrower than the same, to roll or slide upon. Said contacting devices are preferably constructed as shown in the drawings, and comprise trolley-wheels $d\ d\ d'\ d'$, the same being respectively mounted on the ends of segmental bars $d^2$ and $d^3$. These bars are respectively connected to the spring-controlled slides $e\ e'$ by means of screw-threaded studs $d^4$, which pass through said bars and are provided with securing-nuts $d^5$. It will be seen from this that the segmental bars are capable of a pivotal movement on said slides $e\ e'$, and thus cause the trolleys to always bear equally upon the conductors, even though said slides may be tipped to one side or the other. The said slides are movably supported by guides F F' having overlapping flanges $f\ f'$, under which the flanges of the slides are adapted to slide. The guides are in turn supported by the pendent arm or trolley-bar G of the car, they being attached to the opposite sides of the same by bolts $g$, having nuts $g'$, and plates $g^2$ of insulating material are interposed between said guides and the bar G, said guides being thus insulated. Insulating-sleeves $h$ and washers $h'$ are also interposed between the bolts $g$ and nuts $g'$, respectively, and the metal parts which they bind together, and thus any short-circuiting through said parts is prevented.

The trolley-bar G is composed of two bars or plates bolted together, with positive and negative insulated wires H I, respectively, embedded in grooves in the adjoining faces of said bars. The wires leave said grooves some distance above the tops of the slides $e\ e'$, as shown at $j$, and, passing downward, are attached to their respective slides by binding-screws $j'$. The insulated and flexible conductors are sufficiently slack between points $j$ and the binding-screws $j'$ to allow the slides $e\ e'$ to move freely up and down without effecting the electrical connection at this point. The bar G is provided on each side just above the top of the slide with a bowed spring K attached at one end by a bolt to the said bar and at the other by a similar fastening to the top of the slide. It will be seen from the foregoing that the tendency of these springs is to constantly force the slides carrying the trolley-wheels downward and keep said wheels in perfect contact with the flat conductors, even though the car, to which the trolley-bar G is rigidly attached, may rock and thereby raise and lower said bar. All of the trolley-wheels are kept constantly upon the conductors, even though the bar G should incline forward or backward as the car rocks, as the said wheels are mounted on the segmental bars $d^2\ d^3$, which are free to turn on their pivots.

We do not limit ourselves to trolley-wheels, as slides, brushes, or any other contacting devices may be applied to the ends of the segmental arms $d^2\ d^3$ without departing from our invention.

The great advantage of our form of conductors with flat upper contacting-surfaces is that a much greater surface of contact can be utilized than in other constructions, and at the same time the trolley-wheels, slides, or brushes are free to move laterally with the car without diminishing said contacting-surfaces between the conductors and said brushes, wheels, or slides. The same amount of contact cannot be secured from a concave or convex conductor, for although the trolley-wheel might fit such a conductor perfectly at first it would soon wear so that it would contact only at the top or one or the other side. We also provide a single trolley-bar carrying trolley-wheels for two independent circuits and means for independently keeping said trolley-wheels in spring contact with their respective conductors, even though said trolley-bar rise or fall, tip backward or forward, or from side to side.

The simplicity of construction and lack of complicated details both in trolley and conductors, without sacrificing any of the advantages of much more intricate inventions, render this invention a meritorious advance in the art to which it appertains.

What we claim as our invention is—

In combination with a conduit, positive and negative conductors, insulating brackets for supporting said conductors in said conduit, trolley wheels adapted to engage said conductors, a trolley bar composed of two grooved plates bolted together, insulated guide plates provided with right angular flanges and bolt passages, and located upon each side of said bar, insulating sleeves in said bolt passages, securing bolts passing through said sleeves, insulating washers between the heads and securing nuts of said bolts and said guides, slides mounted between said guide plates and having base flanges adapted to pass under the right angular flanges and thus guide the slides in their vertical movements, bow springs for actuating said slides; each of said springs having one end attached to the trolley bar and the opposite end secured to its respective slide, whereby said slide is normally depressed and can rise only under spring pressure, segmental bars pivoted near their centers to said slides respectively, and adapted to support the trolley wheels upon their ends and permit vertical movement of said wheels irrespective of the slides, and conductors for electrically connecting the slides with the car above; said conductors passing through the grooves in said trolley bar but passing out of the same a proper distance from the tops of the slides to which they are respectively secured, substantially as described.

In testimony whereof we hereunto affix our signatures in presence of two witnesses.

JAMES THOMAS.
WILLIAM R. THOMAS.

Witnesses:
R. E. WILLIAMS,
PATRICK MCNALLY.